United States Patent

Searle

[15] 3,705,678
[45] Dec. 12, 1972

[54] FRICTION WELDING APPARATUS
[72] Inventor: John Gilbert Searle, Hednesford, England
[73] Assignee: Allwood Searle & Timney Limited, Digbeth, Walsall, Staffordshire, England
[22] Filed: Nov. 18, 1970
[21] Appl. No.: 90,685

[30] Foreign Application Priority Data

Nov. 19, 1969 Great Britain...................56,525/69

[52] U.S. Cl. .......................228/2, 29/470.3, 156/73, 156/480
[51] Int. Cl. ...........................................B23k 27/00
[58] Field of Search .....228/2; 29/470.3; 156/73, 480

[56] References Cited

UNITED STATES PATENTS

| | | | |
|---|---|---|---|
| 3,420,428 | 1/1969 | Maurya et al. | 228/2 |
| 3,469,300 | 9/1969 | Nagin | 228/2 X |
| 3,543,375 | 11/1970 | Loyd | 228/2 |

Primary Examiner—John F. Campbell
Assistant Examiner—R. J. Craig
Attorney—Scrivener, Parker, Scrivener & Clarke

[57] ABSTRACT

In friction welding apparatus for welding two components together one component is rubbed against the other to produce frictional heat and follows a substantially circular path without rotation. This movement is derived from a follower coupled to a rotor which rotates about a given axis but has a longitudinal axis which is inclined to and intersects the rotational axis. The longitudinal axis thus generates a cone. When the follower is spaced from the apex of the cone it moves in a circular path without rotation and causes complementary movement of one component, but when it is aligned with the apex it no longer moves, even if the rotor continues to rotate, and enables that component to remain stationary while welding is effected. In one embodiment the rotor moves axially of its rotational axis relatively to the follower, while in another embodiment one end of the rotor rotates in a circle of fixed diameter while the apex of the cone is movable in and out of alignment with the follower, which is fixed relative to the rotating end of the rotor.

6 Claims, 5 Drawing Figures

FRICTION WELDING APPARATUS

This invention relates to friction welding apparatus.

When two components are to be welded together by friction welding they are rubbed against each other so that sufficient heat is generated by friction to melt or soften the components in the immediate neighborhood of the rubbing faces. The relative movement is then stopped and the components are urged together, while they cool and harden, and become welded together.

In one simple method of friction welding the components are axially aligned and one of them is rotated about the common axis while the other is held stationary. When sufficient heat has been generated the rotation is stopped and the components welded together. This method suffers from the disadvantage that it is difficult or impossible to use it in welding together components with rubbing faces which are not symmetrical about the common axis and which have to be disposed in predetermined relative angular positions when they are welded together.

In order to overcome or at least to reduce this difficulty the inventor of the present invention has already proposed a method of friction welding in which there is no individual rotation of the components but in which there is relative movement between them such that if one considers any two points on the surfaces, which points come together when the components are welded together, each such point can be considered as rotating about the other. In one such proposal one component is held stationary while the other moves in a circular path without being rotated. This method is satisfactory, but difficulty has been encountered in devising apparatus suitable for carrying out this method, the principal difficulty being in providing means enabling the components to be brought rapidly together in the correct relative positions after their rubbing faces have become melted or softened. The object of the present invention is to provide apparatus which simplifies the desired movement of the components.

According to the present invention there is provided friction welding apparatus comprising first and second supports on which components to be welded together can be mounted, the apparatus being adjustable as between a friction position in which the first support follows a path which is at least substantially circular, but does not rotate, relatively to the second support, and a welding position in which the first support does not move relatively to the second support, the apparatus being characterized in that the movement of the first support is derived from a follower constituting part of drive means which also includes a driving rotor which has a longitudinal axis inclined to and intersecting its axis of rotation, the longitudinal axis thus constituting the generatrix of a notional cone, the follower being so connected to the rotor that the rotor can rotate relatively to it, and adjusting means operative to vary the relationship between the follower and the rotor so that when the apparatus is in its friction position the follower is spaced from the apex of said cone and follows a circular path without rotation, and when the apparatus is in its welding position the follower is aligned with the apex of said cone and neither follows such a path nor rotates, even though the rotor may continue to rotate.

In normal use two components to be welded together are mounted on the two supports. The apparatus is in its friction position and the supports are urged together so that the components abut each other. Rotation of the rotor causes the follower to move in a circular path without rotation. The first support derives its motion from the follower and follows a circular or substantially circular path without rotation. Heat is generated by friction at the abutting faces of the components. When the faces are melted or softened and are hot enough to be welded the apparatus is rapidly adjusted to its welding position so that the follower no longer moves in a circle even though the rotor may continue to rotate. Similarly the first support ceases to move. The two components are then urged together, either with the same force or an increased force, so that welding is effected.

The rotor may be such that the inclination of the longitudinal axis relative to the rotational axis remains fixed during adjustment of the apparatus, the adjusting means being operative to cause relative longitudinal movement between the rotor and the follower. When such apparatus is in its friction position the follower moves in a circle, but when it is in its welding position the follower is aligned with the apex of the cone with the result that it no longer moves in this manner. In a convenient arrangement the rotor comprises a portion with circular symmetry aligned with the rotational axis, which portion rotates in fixed bearings, and a portion of uniform cross-section with its axis inclined to the rotational axis, the latter portion extending through the follower.

There is preferably a subsidiary rotor connected to the aforementioned, or main, rotor so as to be rotatable about the same axis, the subsidiary rotor also having a longitudinal axis inclined to and intersecting the axis of rotation the two longitudinal axes being co-planar but inclined in opposite directions, there being a subsidiary follower so connected to the subsidiary rotor that said rotor can rotate relatively to it, and a counterweight for the first support which can move in a manner analogous to that in which the first support moves, the movement of the counterweight being derived from the subsidiary follower, the arrangement being such that when the apparatus is in its welding position the counterweight does not move, but that when the apparatus is in its friction position the counterweight moves in such a manner as to counteract the dynamic imbalance created by the movement of the first support. The main rotor and subsidiary rotor are preferably arranged coaxially, end-to-end.

In each instance there is preferably a sleeve slidable longitudinally of the rotor but incapable of rotation relatively to the rotor, the sleeve being prevented from axial movement relatively to the follower but capable of rotating about an axis parallel with the axis of rotation of the rotor. In theory there could be a sleeve which was rotatable relatively to the rotor, but such a sleeve would have to be capable of universal motion relative to the follower. With the preferred arrangement the sleeve need only rotate relatively to the follower about an axis which is parallel to the axis of rotation of the rotor and which becomes co-incident with the axis of rotation when the apparatus is in its welding position. That portion of the rotor engaged by the sleeve may be of circular cross-section and be keyed to the sleeve to prevent mutual rotation. In a preferred arrangement, however, the portion is of rectangular or other polygonal cross-section. This is generally easier to manufacture than a portion of circular cross-section and also avoids the need for keys.

In an alternative form of apparatus the rotor is such that the inclination of the longitudinal axis relative to the rotational axis varies during adjustment of the apparatus, the adjusting means being operative to cause relative movement between the apex of said cone and the follower, without relative longitudinal movement between the rotor and the follower. In a convenient embodiment the rotor comprises a longitudinally extensive body one end of which is caused to move in a circular path of constant diameter. A follower is mounted on the body at a fixed distance from said one end. Another part of the rotor is arranged to pivot about a point on the axis of rotation, and this point is movable axially towards and away from said one end. When the point is aligned with the follower there is no circular movement of the follower, but when the point is spaced from the follower there is movement of the follower in a circular path.

Although a single rotor may be employed the movement of the first support is preferably derived from two spaced, parallel rotors adapted to rotate in unison, and two followers, one associated with each rotor. If the first support is driven by a single rotor it is normally necessary to provide some additional restraint for the support in order to prevent it rotating bodily with the rotor. In one arrangement the additional restraint is afforded by a link which is pivoted at one end to a fixed anchorage and at the other end to a point on the support well spaced from the part moved by the follower, the link extending in a direction transverse to the notional line on the support connecting said part with said other end of the link. In another arrangement a pin on the support runs in a fixed guide slot extending generally in the direction of the notional line joining the pin and said part moved by the follower. In each of these arrangements, as in other analogous arrangements, the movement of each part of the support differs slightly from that of the neighboring parts, some parts moving in circular or almost circular paths and other parts moving in closed paths of more elongated shape. The support also performs a slight rocking movement but cannot be said to rotate as a whole. The component or each of the components mounted on the first support is preferably positioned adjacent to the part moved by the follower so that it moves in a substantially circular path.

In order to avoid this non-circular movement of the support it is preferred to use at least two rotors and followers, the mechanisms being parallel and operated in unison and their followers being well spaced apart. With such an arrangement every part of the first support moves in a truly circular path, the radius of the circle depending on the adjustment of the apparatus. It would be possible to use more than two rotors and followers, but two would normally suffice.

Where each part of the first support moves in a truly circular path it is possible to mount components to be welded at any available positions on the support so that much of the support may carry components. Thus in general the number of welding operations which can be carried out at one time is greater when using a support all parts of which move in truly circular paths than when using a support which does not move in this manner.

Where two or more rotors are employed it is necessary to ensure that they operate truly in unison and that backlash is avoided as far as possible. To this end the rotors may have eccentrics interconnected by links, there being at least two links between the or each pair of driving shafts. Alternatively the driving shafts may carry chain-wheels engaging a common chain, or toothed wheels engaging the teeth of a common toothed belt. In a further alternative the driving shafts may be interconnected by spur gears. In a preferred arrangement, where there are two rotors only, they may carry gears driven by worm wheels on a common shaft. Any suitable form of motor may be used to rotate the rotors. If desired the rotors may be driven individually by hydraulic motors operated in series or in parallel.

The means employed for coupling the rotors and causing them to rotate in unison may be contained in a suitable housing which is moved bodily with the rotors if the rotors are moved axially to effect adjustment of the apparatus. The adjustment may be effected in any appropriate manner and may for example be effected by an hydraulic piston-and-cylinder unit. Alternatively it may be effected manually, as for example, by a screw-and-nut unit. Whatever means is used for displacing the rotor or rotors the arrangement is preferably such that the extent of the movement is limited by two stops, one corresponding to the friction position and the other corresponding to the welding position.

In a preferred form of apparatus the rotor, or each of the rotors, is driven by means incorporating a fly-wheel or an equivalent device capable of storing rotational energy. The rotor or rotors would be caused to rotate continuously while the apparatus was in use. The apparatus would normally be used to carry out successive welding cycles, and the arrangement would be such that during that part of each cycle in which the components are being rubbed together to generate heat the rotor or each rotor is taking energy from the fly-wheel or its equivalent, and that during that part of each cycle in which the components are being welded together, are removed and are replaced by new components to be welded together, the fly-wheel or its equivalent absorbs energy from the motor driving the apparatus. The advantage of this arrangement is that the motor can be less powerful than it would need to be if there were no fly-wheel or equivalent device.

The second support is preferably such that it does not perform a circular motion corresponding to that performed by the first support; nevertheless it too may be movable in this manner if desired. If both supports move in this manner and at the same amplitude and with their rotors rotating at the same speeds but in opposite senses the relative movement between the rubbing faces changes considerably throughout each revolution of the driving shafts, there being two moments when the faces are moving in opposite directions generating maximum heat, and two moments when the faces are moving in the same direction generating no heat. For this reason it is preferred to move only the first of the support in this circular or substantially circular manner and not to move the other support in this manner.

While the components to be welded are being rubbed together it is necessary for them to be urged towards each other. Further, when the components are to be welded they must also be urged together. In one type of apparatus one of the components has applied to it a uniform force which is operative both during heat-generation and during welding. In other types of apparatus the force is increased when welding is to be effected. Further, a limit may be placed on the extent of the relative movement of the components as they are brought together for welding. Whatever arrangement is used the apparatus is preferably such that the second support is movable towards the first, while the first does not move in this sense, and the necessary forces are applied to the second support which transmits them to the component or components mounted on it. It will be appreciated that the alternative arrangement in which the second support is fixed and the first support is movable, would still be within the scope of the invention. The means for urging the supports together may be of a conventional kind.

The follower or each follower may be mounted on or in the first support or in some other part or parts directly coupled to the first support. Alternatively the follower may be connected to the first support by means permitting relative movement between the follower and the support though causing the movement of the support to be derived from that of the follower or followers. For example the follower may be used to generate two simple harmonic motions 90° out of phase with each other, these motions being recombined to move the first support in a circular path.

The invention will now be more particularly described with reference to the accompanying drawings, in which.

Figure 1:
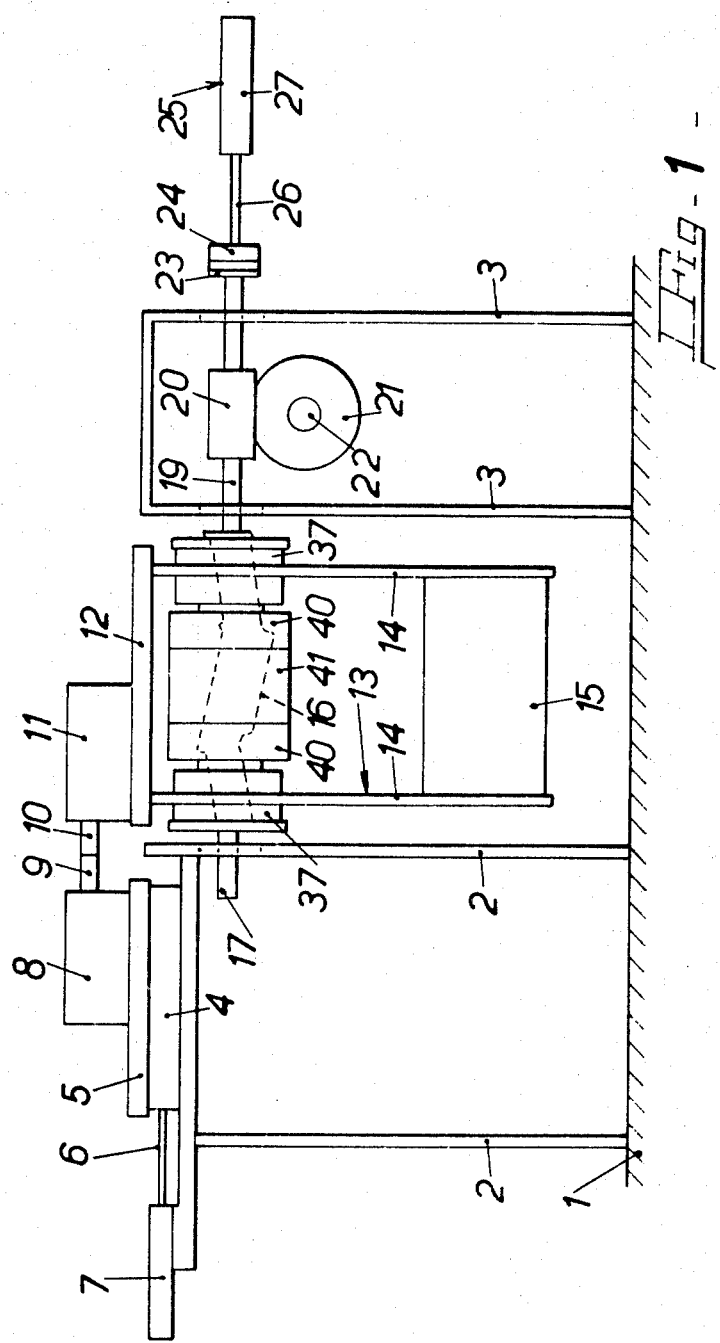
FIG. 1 is a somewhat diagrammatic side view of apparatus embodying the invention.
Figure 2:
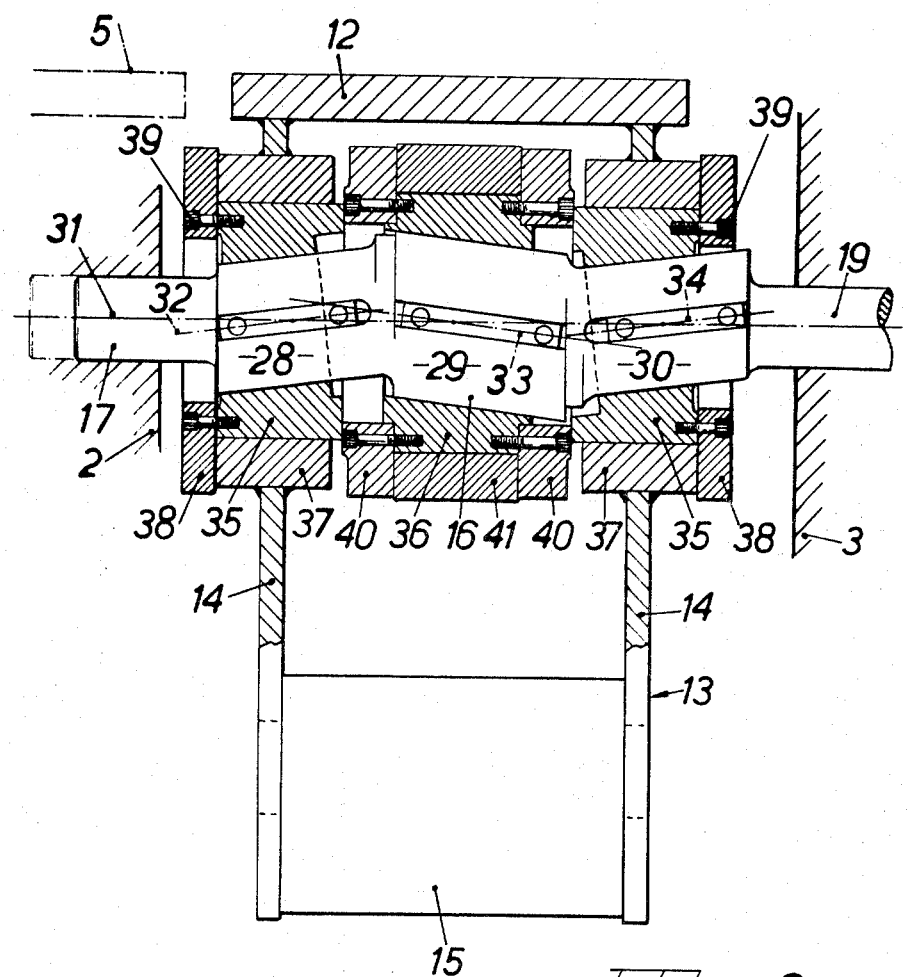
FIG. 2 is a side view, to a larger scale, of part of the apparatus shown in FIG. 1, a portion being sectioned to reveal the interior.

Referring first to FIGS. 1 and 2, these show friction welding apparatus firmly mounted on a base or floor 1, and comprising stands 2 and 3, here shown diagrammatically but in practice constructed so as to be sufficiently strong to withstand the welding forces involved. A slideway 4 is mounted on the top of stand 2, and carries a slide 5 which is connected to the piston-rod 6 of an hydraulic piston-and-cylinder unit 7, the cylinder of the unit 7 being fixed to an extension of the stand 2. A work-support 8 is mounted on the slide 5 and is shown as supporting a component 9 which is to be welded to a component 10 supported by a work-support 11 fixed to the top 12 of a movable carriage 13. The carriage includes parallel end walls 14 depending from the top 12, and a balance weight 15 extending between the lower portions of the walls 14.

The carriage 13 is supported by a pair of similar rotor shafts 16 of the kind described in greater detail below. Only one of the shafts is visible in each of FIGS. 1 and 2 as the other shaft is disposed behind it. One end portion 17 of each shaft 16 is mounted in an appropriate bearing 18 in the stand 2, while the other end portion 19 extends through bearings in the stand 3 and carries a worm 20 engaged by a worm gear 21. The two worm gears 21, one able to drive each shaft 16, are mounted on a common shaft 22 driven by an appropriate electric or other motor (not shown). Each of the shafts 16 can be moved axially for a short distance as indicated by the chain-dotted lines in FIG. 2. The extent of the movement of the shafts in both directions is limited by adjustable stops. The worms 20 and worm gears 21 are such that the shafts can be continuously driven throughout the range of axial movement of the shafts. The ends of the end portions 19 are rotatable in bearings 23 mounted on a transverse member 24 which can be moved to-and-fro by an hydraulic piston-and-cylinder unit 25 of which the piston rod 26 is connected to the member 24, and the cylinder 27 is fixed on an appropriate support or stand (not shown).

As can be seen in FIG. 2 the rotor shaft 16 is shaped so as to comprise three cranks 28, 29 and 30 disposed end-to-end. Each of the cranks constitutes one of the rotors hereinbefore referred to, and has a longitudinal axis inclined to the axis of rotation. The axis of rotation is indicated by the chain-dotted line 31, and the longitudinal axes of the cranks 28, 29 and 30 by the chain-dotted lines 32, 33 and 34 respectively. The axes 32, 33 and 34 lie in a common plane and intersect the axis of rotation 31. Axes 32 and 34 are mutually parallel, while axis 33 is inclined in the opposite direction to those axes. The angles of inclination of the three cranks to the axis of rotation are normally between 5° and 10°. In a typical arrangement the axes 32 and 34 are at 7° to the axis 31 while the axis 33 is at 10° to the axis 31. Each of the cranks is circular in cross-section normal to its longitudinal axis and has a sleeve keyed to it, so that the sleeve can slide longitudinally relatively to the crank but cannot rotate relatively to it. Cranks 28 and 30 have sleeves 35, while crank 29 has a sleeve 36. The sleeves 35 have cylindrical outer surfaces with a common axis co-axial with the axis 31 or parallel with the axis 31. The sleeves 35 are rotatable in bearings 37 fixed in the end walls 14 of the carriage 13. Axial movement of each of the sleeves 35 is prevented in one direction by the engagement between the associated bearing 37 and a ring 38 secured to the sleeve by screws 39, and in the other direction by its engagement with a ring 40 secured by screws to the sleeve 36. A counterweight 41 of generally rectangular shape has two parallel holes which receive the sleeves 36 on the two parallel rotor shafts. The counterweight 41 is located axially by the rings 40. Hydraulic or other suitable bearings (not shown) operate between each of the stands 2 and 3 and the adjacent rings 38 so as to locate the entire carriage assembly axially between the stands.

In use, when the rotor shafts are in the position shown in FIG. 2, and which is referred to as the welding position, the axes of the sleeves 35 and 36 are co-axial with the axis 31. When the motor is started and rotates the shaft 22, the rotor shafts 16 rotate in unison. The sleeves 35 and 36, together with the rings 38 and 40, rotate with them, but the bearings 37 (which constitute the followers referred to above) and the counterweight 41 remain stationary. (Those parts of the counterweight immediately adjacent to the sleeves 36 can also be considered as subsidiary followers). Components 9 and 10 can then be mounted in the work-supports 8 and 11 respectively, the slide 5 being withdrawn for this purpose. The unit 7 is then operated to urge the components into abutment with each other, and the unit 25 is operated to move the rotor shaft 16 axially while it continues to rotate. The apparatus is then said to be in its friction position. The axes of the sleeves 35 have then moved aside from the axis 31, while the axis of the sleeve 36 has also moved aside, but to a greater extent and in the diametrically opposite direction. As the sleeves rotate the bearings 37 and counterweight 41 move in circular paths, but without rotation. The balance weight 15 serves to lower the center of gravity of the carriage 13 to a point between the axes of the rotor shafts 16 so as to reduce the out-of-balance forces acting on the carriage. Further, the movement of the counterweight 41 counteracts the dynamic imbalance caused by the circular movement of the carriage. As the displacement of the counterweight 41 is greater than that of the carriage its weight can be proportionately less than that of the carriage.

In a typical embodiment the rotor shafts 16 rotate at between 5,000 and 6,000 r.p.m. and the carriage 13 and component 10 move in a circle with a maximum radius of one sixteenth of an inch. In alternative embodiments the circle is considerably larger, for example a quarter of an inch, and the speed of rotation of the shafts is correspondingly less.

When the components are sufficiently hot for welding to be effected the unit 25 is operated again to return the apparatus to its welding position. The components 9 and 10 thus become aligned. The force applied by the unit 7 is increased to effect welding, and after the components have become welded together they can be removed from the work-supports.

Figure 3:
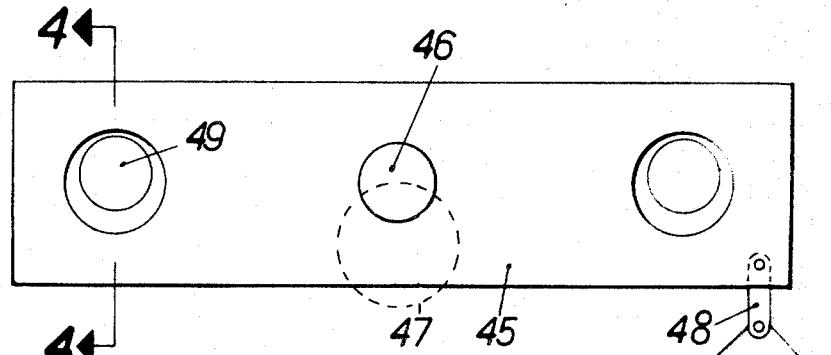
FIG. 3 is a somewhat diagrammatic end view of another form of apparatus embodying the invention.
Figure 4:
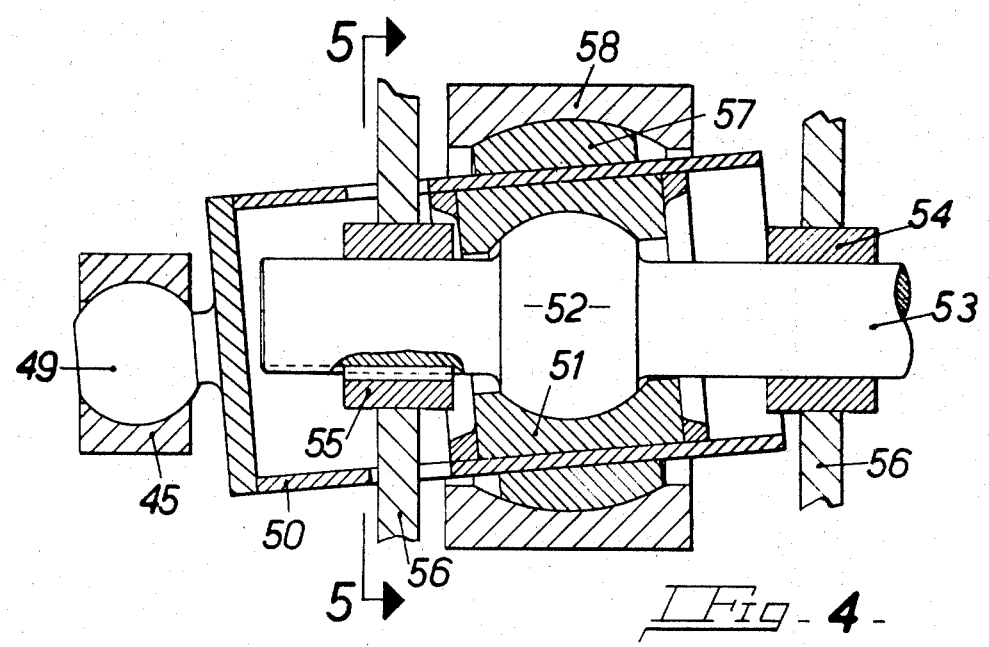
FIG. 4 is a section, to a reduced scale, along the line 4—4 of FIG. 3.
Figure 5:
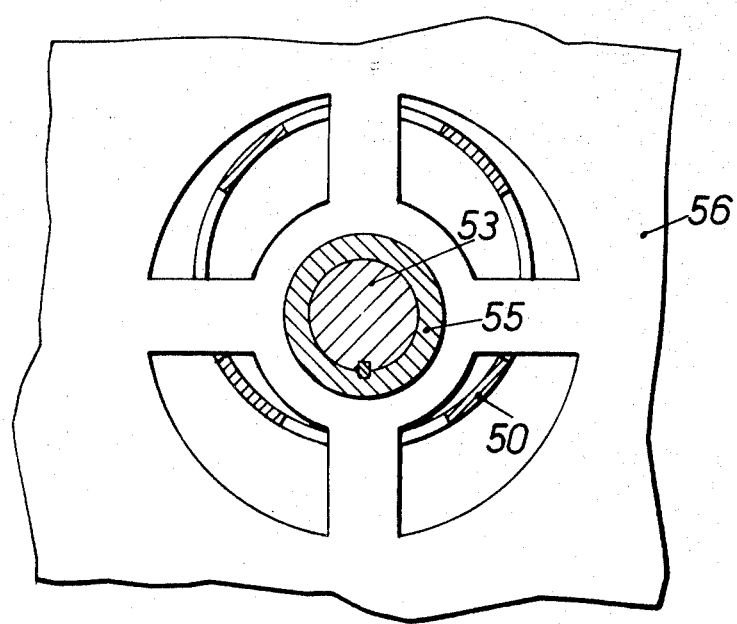
FIG. 5 is a section, to an enlarged scale, along the line 5—5 of FIG. 4.

Referring now to FIGS. 3 to 5, these show an alternative form of apparatus. A drive plate 45 is connected at its center to a crank 46 of a motor-driven shaft, the axis of the crank following the dotted circle 47. A link 48 is pivoted to one end of the plate 45 and to a fixed part of the apparatus and constrains the plate to move in a circular path, of constant diameter, without rotation. Towards each end of the plate 45 is mechanism of the kind shown in FIG. 4. A ball 49 is universally rotatable in the plate 45. The ball 49 is fixed to the end of a hollow cylindrical rotor 50. A bearing 51 is slidable axially inside the rotor 50 and has a part-cylindrical inner surface which engages a ball 52 formed on a shaft 53. As the ball 49 moves in a circular path the axis of the rotor 50 traces out a cone with its apex at the center of the ball 52.

The shaft 53 is mounted in bearings 54 and 55 in parts of a fixed stand 56. The shaft is keyed to the bearing 55 so that it is movable axially but is not rotatable. It will be observed that the rotor 50 and the stand 56 are pierced to allow the one to extend through the other. The shaft can be moved axially be means such as an hydraulic piston-and-cylinder unit which also moves the corresponding shaft of the other mechanism in a similar manner. As the shaft 53 moves, the apex of the cone traced by the axis of the rotor 50 also moves.

A sleeve 57 is fixed to the outside of the rotor 50 and its outer surface, which is part-spherical, engages a complementary part-spherical hole in a follower 58 which is secured to or forms part of a carriage (not shown) which carries a component-support similar to the support 11.

In use, when the apparatus is in its welding position, as shown in FIG. 4, the ball 52, bearing 51, sleeve 57 and follower 58 are concentric with the result that the follower does not move when the ball 49 follows its circular path. When the apparatus is adjusted to its friction position, by moving the shaft 53 axially, the sleeve 57 and follower 58 are no longer concentric with the center of the ball 52 (which is the apex of the cone), with the result that the follower moves in a circle, without rotation.

The remainder of the apparatus is generally similar to that shown in FIG. 1 and includes a second work-support which can be moved axially like the support 8.

I claim:

1. Friction welding apparatus comprising first and second supports on which components to be welded together can be mounted, the apparatus being adjustable as between a friction position in which the first support follows a path which is at least substantially circular, but does not rotate, relatively to the second support, and a welding position in which the first support does not move relatively to the second support, the apparatus being characterized in that the movement of the first support is derived from a follower constituting part of drive means which also includes a driving rotor which has a longitudinal axis inclined to and intersecting its axis of rotation, the longitudinal axis thus constituting the generatrix of a notional cone, the follower being so connected to the rotor that the rotor can rotate relatively to it, and adjusting means operative to vary the relationship between the follower and the rotor so that when the apparatus is in its friction position the follower is spaced from the apex of said cone and follows a circular path without rotation, and when the apparatus is in its welding position the follower is aligned with the apex of said cone and neither follows such a path nor rotates, even though the rotor may continue to rotate.

2. Friction welding apparatus according to claim 1 in which the rotor is such that the inclination of the longitudinal axis relative to the rotational axis remains fixed during adjustment of the apparatus, the adjusting means being operative to cause relative longitudinal movement between the rotor and the follower.

3. Friction welding apparatus according to claim 2 in which there is a subsidiary rotor connected to the aforementioned, or main, rotor so as to be rotatable about the same axis, the subsidiary rotor also having a longitudinal axis inclined to and intersecting the axis of rotation, the two longitudinal axes being co-planar but inclined in opposite direction, there being a subsidiary follower so connected to the subsidiary rotor that said rotor can rotate relatively to it, and a counterweight for the first support which can move in a manner analogous to that in which the first support moves, the movement of the counterweight being derived from the subsidiary follower, the arrangement being such that when the apparatus is in its welding position the counterweight does not move, but that when the apparatus is in its friction position the counterweight moves in such a manner as to counteract the dynamic imbalance created by the movement of the first support.

4. Friction welding apparatus according to claim 2 in which there is a sleeve slidable longitudinally of the rotor but incapable of rotation relatively to the rotor, the sleeve being prevented from axial movement relatively to the follower but capable of rotating about an axis parallel with the axis of rotation of the rotor.

5. Friction welding apparatus according to claim 1 in which the rotor is such that the inclination of the longitudinal axis relative to the rotational axis varies during adjustment of the apparatus, the adjusting means being operative to cause relative movement between the apex of said cone and the follower without relative longitudinal movement between the rotor and the follower.

6. Friction welding apparatus according to claim 1 in which the movement of the first support is derived from two spaced, parallel rotors adapted to rotate in unison, and two followers, one associated with each rotor.

* * * * *